(12) United States Patent
Mongoin et al.

(10) Patent No.: US 8,785,536 B2
(45) Date of Patent: Jul. 22, 2014

(54) USE OF ACRYLIC POLYMERS NEUTRALIZED BY LITHIUM AS DISPERSING AGENTS OR GRINDING AID AGENTS OF MINERAL MATERIALS IN AN AQUEOUS MEDIUM

(75) Inventors: Jacques Mongoin, Quincieux (FR); Christian Jacquemet, Lyons (FR)

(73) Assignee: Coatex, Genay (FR)

( * ) Notice: Subject to any disclaimer, the term of this patent is extended or adjusted under 35 U.S.C. 154(b) by 111 days.

(21) Appl. No.: 13/140,226

(22) PCT Filed: Dec. 8, 2009

(86) PCT No.: PCT/IB2009/007671
§ 371 (c)(1),
(2), (4) Date: Jul. 19, 2011

(87) PCT Pub. No.: WO2010/070407
PCT Pub. Date: Jun. 24, 2010

(65) Prior Publication Data
US 2011/0263774 A1    Oct. 27, 2011

(30) Foreign Application Priority Data

Dec. 19, 2008    (FR) ...................................... 08 58819

(51) Int. Cl.
*C08K 3/26*    (2006.01)
*C08K 3/22*    (2006.01)
*C08L 33/02*    (2006.01)

(52) U.S. Cl.
USPC ........... 524/425; 524/556; 524/430; 524/549; 524/547

(58) Field of Classification Search
None
See application file for complete search history.

(56) References Cited

U.S. PATENT DOCUMENTS

| 6,767,973 | B2 * | 7/2004 | Suau et al. | ................. | 525/329.7 |
| 2003/0045647 | A1 | 3/2003 | Suau et al. | | |
| 2008/0199419 | A1 * | 8/2008 | Suau et al. | ................. | 424/78.02 |
| 2009/0209692 | A1 | 8/2009 | Suau et al. | | |

FOREIGN PATENT DOCUMENTS

| FR | 2 903 618 | | 1/2008 |
| FR | 2903618 | A1 * | 1/2008 |
| WO | 01 48093 | | 7/2001 |

OTHER PUBLICATIONS

International Search Report Issued Apr. 13, 2010 in PCT/IB09/007671 filed Dec. 8, 2009.

* cited by examiner

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

The invention pertains to the use of a homopolymer of acrylic acid or a copolymer of acrylic acid with a water-soluble monomer, as a dispersing agent or grinding aid agent in a method for manufacturing an aqueous suspension of mineral materials through dispersion and/or grinding, characterized in that the carboxylic groups of said agent are fully or partially neutralized by the lithium ion and in that it exhibits a viscosity index of between 0.01 and 0.08.

20 Claims, No Drawings

USE OF ACRYLIC POLYMERS NEUTRALIZED BY LITHIUM AS DISPERSING AGENTS OR GRINDING AID AGENTS OF MINERAL MATERIALS IN AN AQUEOUS MEDIUM

This application is a National Stage application of PCT/IB09/007,671 filed Dec. 8, 2009. Priority to French application Ser. No. 08/58819 filed Dec. 19, 2008, is claimed.

The present invention pertains to agents implemented to disperse or to assist in grinding mineral materials in a wet medium.

It enables the person skilled in the art to minimize the quantity of homopolymers and copolymers of acrylic acid commonly implemented in these operations, though without altering the stability and solids content of the aqueous suspensions of mineral materials manufactured in this way. This invention relies on the implementation of lithium as a particular neutralization agent of these polyacrylates. Surprisingly and advantageously, the result is a reduction in the quantity of dispersing agent or grinding aid agent used, while maintaining the aforementioned properties, compared to those obtained with polyacrylates of the prior art, which are neutralized differently.

The mineral industry is a major consumer of chemicals. These chemicals are used during the various conversion/modification/treatment steps that the mineral materials undergo. Thus, for a natural or synthetic calcium carbonate, numerous so-called "grinding" operations (reducing the grain size of the particles) in a dry or wet medium, or so-called "dispersion" operations (placing particles in suspension in a liquid), are performed.

These two actions are made easier by the respective implementation of grinding agents, whose role is to facilitate the mechanical action of particle attrition and fragmentation, and dispersing agents, whose function consists of keeping the viscosity of the suspension within acceptable ranges as the mineral materials are added to it.

The prior art is particularly detailed when it comes to such additives. For many years, it has been known that the homopolymers of acrylic acid constitute effective agents for assisting with the dispersion or grinding of the calcium carbonate in a wet medium. By way of reference, one may refer to documents FR 2,539,137, FR 2,683,536, FR 2,683,537, FR 2,683,538, FR 2,683,539 and FR 2,802,830, FR 2,818,165 which illustrate several variants of these homopolymers, depending on their molecular weight and neutralization.

For the same type of applications, it is also beneficial to copolymerize acrylic acid with another carboxylic monomer, such as methacrylic acid or maleic anhydride (on that matter, see documents EP 0850 685 and FR 2,903,618) and/or with another ethylenically unsaturated monomer but without a carboxylic function, such as an acrylic ester: this latter variant is described in the documents cited in the previous paragraph.

That said, from the viewpoint of legislation and environmental requirements, reducing the quantity of polymer implemented remains a priority for the person skilled in the art, as it is suitable for a level of performance equivalent to that obtained to date. Among these performances, of particular note is the stability of the aqueous suspensions of mineral materials that are made, as determined by Brookfield™ viscosity measurements taken at different moments, and the final solids content expressed as a % by dry weight of mineral materials in relation to the total weight of said suspensions (in the remainder of the Application, the solids content will always be expressed this way).

To that end, the document FR 2,894,846 instructs the implementation of fluorated compounds with polyacrylates of the prior art, thereby making it possible to reduce their dose in methods of dispersing and grinding mineral materials. This solution, however, does exhibit the drawback of implementing, in addition to a polyacrylate, an additional product whose storage and implementation must be managed by the person skilled in the art.

It is also known that reducing the polymolecularity index of acrylic polymers gives these polymers improved dispersion and grinding properties. This is particularly described in the documents "Dispersion of calcite by poly(sodium acrylate) prepared by reversible addition-fragmentation chain transfer (RAFT) polymerization" (Polymer (2005), 46(19), pp. 8565-8572) and "Synthesis and Characterization of Poly (acrylic acid) Produced by RAFT Polymerization. Application as a Very Efficient Dispersant of CaCO3, Kaolin, and TiO2" (Macromolecules (2003), 36(9), pp. 3066-3077).

A method for reducing this polymolecularity index consists, for a given polymer, of isolating chains with a certain molecular weight through static and dynamic techniques of separation in the presence of solvents, as described in the document EP 0,499,267. Another means relies on the implementation of so-called "controlled" radical polymerization (CRP). This term refers to synthesis techniques based on the use of transfer agents of particular chains, such as xanthates or trithiocarbonates (see documents EP 1,529,065 and EP 1,377,615). By reducing the polymolecularity index of the fabricated acrylic polymers, their ability to effectively disperse or grind a minimal material in water is increased.

However, these solutions based on separation or CRP techniques are sometimes difficult to implement, as they require special installations that not every industrial facility necessarily has. Proposing a simple solution making it possible to improve the performance of the polyacrylates of the prior art as dispersing and grinding aid agents of mineral materials in an aqueous medium, i.e. making it possible to reduce their quantity for an equivalent level of performance, currently constitutes an unresolved problem.

Continuing her research in this field, the Applicant has successfully developed the use of a homopolymer of acrylic acid or a copolymer of acrylic acid with a water-soluble monomer, as a dispersing agent or grinding aid agent in a method for manufacturing an aqueous suspension of mineral materials through dispersion and/or grinding, characterized in that:

a) the carboxylic groups of said agent are fully or partially neutralized by the lithium ion, b) it exhibits a viscosity index of between 0.01 and 0.08.

Entirely unexpectedly, compared to the same acrylic polymer of the prior art neutralized differently, the inventive acrylic polymer makes it possible to more effectively disperse and grind a mineral material in an aqueous medium. To that end, it is demonstrated that, for a performance level that is at least equivalent (in terms of solids content, and stability of the Brookfield viscosity measured at 100 revolutions per minute), the invention successfully reduces the quantity of polymer implemented compared to the prior art.

The fact that said agent is fully or partially neutralized by lithium means that all or some of its carboxylic functions are neutralized by lithium. Whenever the lithium neutralization is partial, the resulting polymer may potentially be fully neutralized, with the other carboxylic functions being neutralized by a different agent than lithium.

Although lithium was described as a possible neutralization agent in the prior art (see all of the aforementioned documents), there was no disclosure or instruction encouraging the person skilled in the art to implement this particular compound, for the purpose of reducing the level of polyacrylates implemented to disperse or grind a mineral material in water.

The characteristic relating to the viscosity index refers to polymers with a normal molecular weight, implemented to disperse or grind a mineral material such as calcium carbonate. The claimed range corresponds, by way of example, to a molecular weight between 1,000 g/mol and 15,000 g/mol for a homopolymer of acrylic acid. The viscosity index is preferred, which can easily be measured with conventional laboratory equipment for homopolymers and copolymers of acrylic acid. On the other hand, determining a molecular weight requires more sophisticated detection devices, and especially master samples which sometimes are not available on the market in the case of some copolymers of acrylic acid, depending on what the other monomer is.

Thus, a first object of the invention consists of the use within a method for manufacturing an aqueous suspension of mineral materials through dispersion and/or grinding, as a dispersing agent or grinding aid agent, of a homopolymer of acrylic acid or a copolymer of acrylic acid with a water-soluble monomer, characterized in that:

a) the carboxylic groups of said agent are fully or partially neutralized by the lithium ion, b) it exhibits a viscosity index of between 0.01 and 0.08.

This use is further characterized in that the percentage by molar weight of the carboxylic groups neutralized by the lithium ion is between 10% and 100%, preferably between 50% and 100%, very preferably between 80% and 100%, and in that the percentage of neutralization by the most preferred lithium ion is equal to 100%.

This use is further characterized in that the lithium ion used to fully or partially neutralize said agent's carboxylic groups, is provided in the form of lithium hydroxide. Obviously, the lithium may be provided by means of another chemical compound bearing that ion.

This use is further characterized in that, for the copolymer of acrylic acid with another monomer, this other monomer is chosen from among methacrylic acid, maleic anhydride, acrylamido-methylpropane sulfonic acid, phosphoric esters of glycol alkylene, and non-ionic monomers with the formula (I):

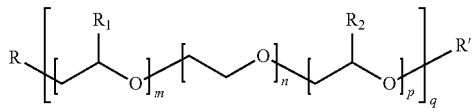

wherein m, n, p and q are whole numbers and m, n, and p are less than 150, q is greater than 0, and at least one whole number among m, n, and p is non-zero, R is a radical comprising a polymerizable unsaturated function, $R_1$ and $R_2$ are identical or different and represent hydrogen atoms or alkyl groups, R' represents hydrogen or a hydrocarbonated radical having 1 to 40 carbon atoms, or an ionic or ionizable group.

This use is further characterized, whenever a portion of the carboxylic groups of said agent is neutralized by a different ion than lithium, in that the other ion is chosen from among calcium, magnesium, sodium, potassium, ammonia, and mixtures thereof.

This use is further characterized in that said agent may be, before or after its total or partial neutralization reaction, treated and separated into several phases, according to static or dynamic processes, by one or more polar solvents preferably belonging to the group constituted by water, methanol, ethanol, propanol, isopropanol, the butanols, acetone, tetrahydrofuran or mixtures thereof.

This use is further characterized in that said agent is obtained by processes of radical polymerization in solution, in a direct or inverse emulsion, in suspension or precipitation in solvents, in the presence of catalytic systems and chain transfer agents, or by processes of controlled radical polymerization, and preferably by nitroxide mediated polymerization (NMP) or by cobaloximes, by atom transfer radical polymerization (ATRP), by radical polymerization controlled by sulphurated derivatives, chosen from among carbamates, dithioesters or trithiocarbonates (RAFT) or xanthates.

This use is further characterized in that said aqueous suspension, after dispersion and/or grinding, exhibits an initial Brookfield™ viscosity, and one after 8 days of storage, measured at 25° C., at 100 revolutions per minute and after 1 minute of agitation, both less than 4,000 mPa·s, preferably 2,000 mPa·s, and very preferably 500 mPa·s.

This use is further characterized in that said aqueous suspension, after dispersion and/or grinding, exhibits a solid content expressed as a percentage by dry weight of mineral materials in relation to its total weight, of between 10% and 82%, preferably between 50% and 81%, and very preferably between 65% and 72%.

This use is further characterized in that said aqueous suspension exhibits a content of said agent by dry weight, in relation to the total dry weight of mineral materials, of between 0.001% and 5.000%, preferably between 0.001% and 2.000%, and very preferably between 0.05% and 1.00%.

In one particular variant, this use is further characterized in that said method of manufacturing an aqueous suspension of mineral materials through dispersion and/or grinding is a method comprising a first step of grinding without a dispersing agent at a concentration by dry weight of mineral materials of between 10% and 35% of the suspension's total weight, and a second step of dispersion in the presence of said agent, at a concentration by dry weight of mineral materials of between 65% and 72% of the total weight of the suspension.

This use is further characterized in that the mineral materials are chosen from among natural and synthetic calcium carbonate, talc, kaolin, and mixtures thereof, and preferably from among natural and synthetic calcium carbonate and mixtures thereof.

EXAMPLES

In all the examples, the polymer viscosity indices, abbreviated η, are determined as follows.

The acidic form of the compound whose viscosity index must be determined is 100% neutralized by sodium hydroxide, then diluted to 50 g/L in bipermutated water.

This parent solution, whose concentration is abbreviated $c_0$, undergoes the following dilutions: 2/3 $c_0$, 1/2 $c_0$, 1/3 $c_0$, 1/4 $c_0$, 1/6 $c_0$, 1/12 $c_0$, 1/18 $c_0$, 1/24 $c_0$, 1/36 $c_0$.

Each solution's specific viscosity at 25° C. and atmospheric pressure is then determined using a SCHOTT AVS/500 viscosity system equipped with a Ubbelohde tube, part number 53010/I, and constant of 0.01, and the graph of specific viscosity as a function of the concentration is drawn.

The linear part of the curve is used to obtain the viscosity index: this is the specific viscosity limit when the concentration tends toward zero.

All of the particle size distributions, and the indicated diameters, are determined with a Sedigraph™ 5100 device, sold by the company MICROMERITICS™.

Example 1

This example describes the preparation of mineral materials which will be dispersed or ground afterward with polymers of the invention or the prior art.

Test No. 1

This test concerns the preparation of a scalenohedral precipitated calcium carbonate, with a $d_{50}$ value of 2.3 μm.

To do so, 200 kg of calcium oxide are added to 1700 liters of water at 40° C. in a reactor kept agitating for 30 minutes. The resulting suspension exhibits a solids content of 13.3% by dry weight of calcium hydroxide in relation to its total weight; it is then sifted through a 100 μm sieve.

The precipitation is carried out in an 1800 L cylindrical steel reactor equipped with an agitator, as well as means for controlling the pH and conductivity. 1700 liters of the aforementioned suspension are added to the reactor, with the temperature set to 50° C.

A gas is then caused to bubble to the top of the reactor (with its $CO_2$ content between about 20 and 30% by volume), at a flow rate of 200 m$^3$/h, with agitation of between 200 and 300 revolutions/minute, with the gas's excess pressure being between 150 and 200 mbar, which corresponds to the hydrostatic pressure of the suspension of calcium hydroxide within the reactor.

During carbonation, the temperature and pressure are not controlled, and may increase, particularly due to the exothermic nature of the precipitation reaction.

Once the conductivity has reached a minimum value, the gas flow is maintained for 4 minutes, then cut off.

The resulting product is filtered through a 45 μm said, and retrieved in the form of a suspension whose solids content is 17.4% by dry weight of precipitated calcium carbonate, in relation to its total weight.

The result is particles of precipitated calcium carbonate whose polymorphous are scalenohedral calcites, whose $d_{50}$ is equal to 2.3 μm, and whose specific surface area measured using the BET method is equal to 6.3 m$^2$/g.

The water in the suspension is dried through evaporation, so as to obtain a solid whose dry material content is greater than 99.5% of its total weight. This mineral is called mineral 1.

Test No. 2

This test pertains to the preparation of a natural calcium carbonate which is a marble of Norwegian origin, from rocks whose diameter is between 10 and 300 mm, which are ground up autogenously until a $d_{50}$ of 45 μm is obtained.

The mineral material obtained is called mineral 2.

Test No. 3

This test pertains to the preparation of a natural calcium carbonate which is a marble of Norwegian origin, with a $d_{50}$ of 0.8 μm.

Mineral 2 is ground up in an aqueous medium at a concentration equal to 20% by dry weight of calcium carbonate in relation to the total weight of said suspension, in a Dynomill vertical attrition mill, in recirculation mode, without any dispersing agent or grinding aid agent. The grinding is continued until a degree of fineness is achieved such that 60% of the particles by weight have an average diameter less than 1 μm. At the end of the grinding, the particles have a $d_{50}$ of 0.8 μm.

After grinding, the suspension is concentrated in a tube squeezer to form a filtration cake whose solids content is between 80 and 83% of its total weight.

The mineral material obtained is called mineral 3.

Test No. 4

This test pertains to the preparation of two natural calcium carbonates which are marbles of Norwegian origin, with a $d_{50}$ of 0.6 μm.

Mineral 2 is ground up in an aqueous medium at a concentration of between 15% and 25% by dry weight of calcium carbonate in relation to the total weight of said suspension, in a Dynomill vertical attrition mill, in recirculation mode, without any dispersing agent or grinding aid agent. The grinding is continued until a degree of fineness is achieved such that 75% of the particles by weight have an average diameter less than 1 μm. At the end of the grinding, the particles have a $d_{50}$ of 0.6 μm.

After grinding, the resulting suspension is concentrated into a tube-squeezer so as to obtain a cake whose solids content is equal to 69.5% of its total weight.

The mineral material obtained is called mineral 4.

Test No. 5

This test pertains to the preparation of two natural calcium carbonates which are marbles of Norwegian origin, with a $d_{50}$ of 0.4 μm.

Mineral 2 is ground up in an aqueous medium at a concentration equal to 20% by dry weight of calcium carbonate in relation to the total weight of said suspension, in a Dynomill vertical attrition mill, in recirculation mode, without any dispersing agent or grinding aid agent. The grinding is continued until a degree of fineness is achieved such that 85% of the particles by weight have an average diameter less than 1 μm. At the end of the grinding, the particles have a $d_{50}$ of 0.4 μm.

After grinding, the result in suspension is concentrated into a tube squeezer so as to obtain a cake whose solids content is between 78% and 80% of its total weight. The mineral material obtained is called mineral 5.

Example 2

This test pertains to the implementation of homopolymers and copolymers of acrylic acid according to the prior art and the invention, to disperse the natural calcium carbonate known as mineral 4, in view of obtaining a given solids content (SC as a % by dry weight of mineral material in relation to the total weight of the suspension).

To do so, said calcium carbonate and polymer are added to a Pendraulik mixer, at a speed of about 3,000 revolutions per minute for 5 to 10 minutes.

The abbreviations and quantities measured are identical to those described in the previous example. The corresponding results appear in table 1.

TABLE 1

| Test no. | η | neutralization | SC (%) | dose (%) | $\mu_{100\,t0}$ (mPa·s) | $\mu_{100\,t8}$ (mPa·s) |
|---|---|---|---|---|---|---|
| 2-1 PA | 0.01 | Na/Mg (50/50) | 55.4 | 1.05 | 1130 | >3000 |
| 2-2 PA | 0.04 | K (100) | 67.8 | 0.88 | >4000 | >4000 |
| 2-3 PA | 0.04 | Na (100) | 66.8 | 0.73 | >4000 | >4000 |
| 2-4 PA | 0.07 | Na (100) | 67.5 | 0.50 | >4000 | >4000 |
| 2-5 PA | 0.07 | Na (100) | 67.5 | 0.89 | >4000 | >4000 |
| 2-6 PA | 0.07 | Na (100) | 67.5 | 1.77 | >4000 | >4000 |
| 2-7* PA | 0.075 | Na (100) | 67.2 | 0.49 | 121 | <500 |
| 2-8 IN | 0.01 | Li (100) | 61.6 | 0.40 | 64 | <200 |
| 2-9 IN | 0.04 | Li (100) | 66.2 | 0.14 | 85 | <200 |
| 2-10 IN | 0.04 | Li (100) | 66.2 | 0.16 | 56 | <200 |
| 2-11 IN | 0.04 | Li (100) | 66.2 | 0.29 | 64 | <200 |
| 2-12 IN | 0.04 | Li (100) | 69.5 | 0.13 | 570 | 850 |
| 2-13 IN | 0.04 | Li (100) | 69.5 | 0.17 | 69 | <200 |
| 2-14 IN | 0.04 | Li (85) | 64.0 | 0.15 | 1400 | <2000 |
| 2-15 IN | 0.04 | Li (85) | 64.0 | 0.23 | 74 | <200 |
| 2-16 IN | 0.04 | Li/K (50/50) | 68.1 | 0.25 | 71 | <200 |

TABLE 1-continued

| Test no. | η | neutralization | SC (%) | dose (%) | $\mu_{100\,t0}$ (mPa·s) | $\mu_{100\,t8}$ (mPa·s) |
|---|---|---|---|---|---|---|
| 2-17 IN | 0.04 | Li/Na (85/15) | 63.2 | 0.21 | 52 | <200 |
| 2-18 IN | 0.04 | Li/Mg (50/50) | 69.3 | 0.77 | 410 | <2000 |
| 2-19 IN | 0.04 | Li/Mg/K (25/50/25) | 66.1 | 0.80 | 1660 | <4000 |
| 2-20 IN | 0.04 | Li/Na (93/7) | 64.6 | 0.16 | 60 | <200 |
| 2-21* IN | 0.075 | Na/Li (50/50) | 67.2 | 0.25 | 70 | <200 |

*copolymer of acrylic acid and maleic anhydride (50%/50% by weight)

These results demonstrate that the inventive polymers make it possible, at levels less than those practiced for the prior art, to obtain a solid content and viscosity stability which are both at least equivalent to those obtained for the prior art.

Example 3

This test pertains to the implementation of homopolymers and copolymers of acrylic acid according to the prior art and the invention, to disperse the natural calcium carbonate known as mineral 3, in view of obtaining a given solids content (SC as a % by dry weight of mineral material in relation to the total weight of the suspension).

To do so, said calcium carbonate and polymer are added to a Pendraulik mixer, at a speed of about 3,000 revolutions per minute for 5 to 10 minutes.

The abbreviations and quantities measured are identical to those described in the previous example. The corresponding results appear in table 2.

TABLE 2

| Test no. | η | Neutralization | SC (%) | dose (%) | $\mu_{100\,t0}$ (mPa·s) | $\mu_{100\,t8}$ (mPa·s) |
|---|---|---|---|---|---|---|
| 3-1 PA | 0.04 | Na (100) | 72.1 | 2.00 | >4000 | >4000 |
| 3-2 IN | 0.07 | Li (100) | 72.1 | 0.24 | 81 | <200 |

These results demonstrate that the inventive polymers make it possible, at levels less than those practiced for the prior art, to obtain a solid content and viscosity stability which are both at least equivalent to those obtained for the prior art.

Example 4

This test pertains to the implementation of homopolymers and copolymers of acrylic acid according to the prior art and the invention, to disperse the natural calcium carbonate known as mineral 5, in view of obtaining a given solids content (SC as a % by dry weight of mineral material in relation to the total weight of the suspension).

To do so, said calcium carbonate and polymer are added to a Pendraulik mixer, at a speed of about 3,000 revolutions per minute for 5 to 10 minutes.

The abbreviations and quantities measured are identical to those described in the previous example. The corresponding results appear in table 3.

TABLE 3

| Test no. | η | Neutralization | SC (%) | dose (%) | $\mu_{100\,t0}$ (mPa·s) | $\mu_{100\,t8}$ (mPa·s) |
|---|---|---|---|---|---|---|
| 4-1 PA | 0.04 | Na (100) | 65.0 | 2.00 | >4000 | ** |
| 4-2 IN | 0.04 | Li (100) | 72.1 | 0.24 | 81 | <200 |

**too viscous to be measured

These results demonstrate that the inventive polymers make it possible, at levels less than those practiced for the prior art, to obtain a solid content and viscosity stability which are both at least equivalent to those obtained for the prior art.

Example 5

This test pertains to the implementation of homopolymers of acrylic acid according to the prior art and the invention, to grind the calcium carbonate known as mineral 2.

To do so, mineral 1 is ground in a vertical Dynomill mill in recirculation mode until a degree of fineness is obtained in such that 50% by weight of the particles have an average diameter less than 0.7 μm.

The corresponding results appear in table 4.

Also measured is the % by weight of the particles, whose average diameter is less than 0.2 μm, 1 μm, and 2 μm, respectively abbreviated as %<0.2 μm, %<1 μm, and %<2 μm.

TABLE 4

| Test no. | η | Neutralization | SC (%) | dose (%) | $\mu_{100\,t0}$ (mPa·s) | $\mu_{100\,t8}$ (mPa·s) | % <0.2 μm % <1 μm % <2 μm |
|---|---|---|---|---|---|---|---|
| 5-1 PA | 0.04 | Na (100) | 78.0 | 0.7 | — | — | — |
| 5-2 IN | 0.04 | Li (100) | 78.1 | 0.58 | 149 | 200 | 16 64 92 |

**too viscous to be measured

These results demonstrate that the inventive polymers make it possible, at levels less than those practiced for the prior art, to obtain a solid content and viscosity stability which are both at least equivalent to those obtained for the prior art.

Example 6

This example illustrates the implementation of homopolymer is an acrylic acid according to the invention and the prior art, to grind and then disperse a precipitated calcium carbonate which is mineral 1.

To do so, said calcium carbonate and polymer are added to a Pendraulik mixer, at a speed of about 3,000 revolutions per minute for 5 to 10 minutes.

The same quantities are measured as before.

The corresponding results appear in table 5.

TABLE 5

| Test no. | η | Neutralization | SC (%) | dose (%) | $\mu_{100\,t0}$ (mPa·s) | $\mu_{100\,t8}$ (mPa·s) |
|---|---|---|---|---|---|---|
| 6-1 PA | 0.04 | Na/Mg (50/50) | 60.1 | 1.5 | >4000 | >4000 |
| 6-2 IN | 0.04 | Li (100) | 59.7 | 0.74 | 120 | <200 |

These results demonstrate the superiority of the polymers according to the invention.

The invention claimed is:

1. A method of manufacturing an aqueous suspension comprising dispersing and/or grinding a mineral material in the presence of an agent comprising a homopolymer of acrylic acid or a copolymer of acrylic acid with a water-soluble monomer wherein:
   a) the carboxylic groups of said agent are fully or partially neutralized by lithium, and
   b) said agent has a viscosity index of between 0.01 and 0.075.

2. The method according to claim 1, wherein the percentage by molar weight of the carboxylic groups neutralized by the lithium is between 10% and 100%.

3. The method according to claim 1, wherein the water soluble monomer for the copolymer is chosen from methacrylic acid, maleic anhydride, acrylamido-methylpropane sulfonic acid, phosphoric esters of glycol alkylene, and non-ionic monomers with the formula (I):

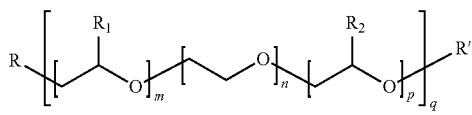

wherein m, n, p and q are whole numbers and m, n, and p are less than 150, q is greater than 0, and at least one whole number among m, n, and p is non-zero, R is a radical comprising a polymerizable unsaturated function, $R_1$ and $R_2$ are identical or different and represent hydrogen atoms or alkyl groups, R' represents hydrogen or a hydrocarbonated radical having 1 to 40 carbon atoms, or an ionic or ionizable group.

4. The method according to claim 1, wherein said carboxylic groups of said agent are partially neutralized by lithium and partially neutralized by at least one selected from the group consisting of calcium, magnesium, sodium, potassium, and ammonia.

5. The method according to claim 1, wherein the agent may be, before or after its total or partial neutralization reaction, treated and separated into several phases, according to static or dynamic processes, by one or more polar solvents selected from the group constituted by water, methanol, ethanol, propanol, isopropanol, butanol, acetone, tetrahydrofuran or mixtures thereof.

6. The method according to claim 1, wherein said agent is obtained by a process comprising radical polymerizing in solution, in a direct or inverse emulsion, in suspension or precipitation in solvents, in the presence of catalytic systems and chain transfer agents, or by a process comprising controlled radical polymerizing, and preferably by nitroxide mediated polymerizing (NMP) or by cobaloximes, by atom transfer radical polymerizing (ATRP), by radical polymerizing controlled by sulphurated derivatives, chosen from among carbamates, dithioesters or trithiocarbonates (RAFT) or xanthates.

7. The method according to claim 1, wherein said aqueous suspension, after dispersion and/or grinding, exhibits a solids content expressed as a percentage by dry weight of mineral materials in relation to its total weight, of between 10% and 82%.

8. The method according to claim 1, wherein said aqueous suspension exhibits a content of said agent by dry weight, in relation to the total dry weight of mineral materials, of between 0.001% and 5.000%.

9. The method according to claim 1, wherein said method comprises first grinding without a dispersing agent at a concentration by dry weight of mineral material of between 10% and 35% of the suspension's total weight, and then dispersion in the presence of said agent, at a concentration by dry weight of mineral material of between 65% and 72% of the total weight of the suspension.

10. The method according to claim 1, wherein the mineral material is selected from the group consisting of natural and synthetic calcium carbonate, talc, kaolin, and mixtures thereof.

11. The method according to claim 1, comprising dispersing said mineral material in the presence of said agent.

12. The method according to claim 1, comprising grinding said mineral material in the presence of said agent.

13. The method according to claim 1, comprising dispersing and grinding said mineral material in the presence of said agent.

14. The method according to claim 1, wherein said aqueous suspension exhibits an initial Brookfield™ viscosity, and a Brookfield™ viscosity after 8 days of storage, measured at 25° C., at 100 revolutions per minute and after 1 minute of agitation, both of which are less than 4,000 mPa·s.

15. The method according to claim 1, wherein said aqueous suspension exhibits an initial Brookfield™ viscosity, and a Brookfield™ viscosity after 8 days of storage, measured at 25° C., at 100 revolutions per minute and after 1 minute of agitation, both of which are less than 2,000 mPa·s.

16. The method according to claim 1, wherein said aqueous suspension exhibits an initial Brookfield™ viscosity, and a Brookfield™ viscosity after 8 days of storage, measured at 25° C., at 100 revolutions per minute and after 1 minute of agitation, both of which are less than 500 mPa·s.

17. The method according to claim 1, wherein said agent has a viscosity index of between 0.01 and 0.07.

18. The method according to claim 1, wherein the aqueous suspension prepared has a solid content expressed as a percentage by dry weight of mineral material in relation to its total weight, of between 10% and 82% and a content of said agent by dry weight, in relation to the total dry weight of mineral material, of between 0.001% and 5.000%, and wherein the percentage by molar weight of the carboxylic groups neutralized by the lithium ion is between 50% and 100%.

19. The method according to claim 1, wherein the aqueous suspension prepared has a solid content expressed as a percentage by dry weight of mineral material in relation to its total weight, of between 50% and 81% and a content of said agent by dry weight, in relation to the total dry weight of mineral material, of between 0.001% and 2.000%, and wherein the percentage by molar weight of the carboxylic groups neutralized by the lithium ion is between 50% and 100%.

20. The method according to claim 1, wherein the aqueous suspension prepared has a solid content expressed as a percentage by dry weight of mineral material in relation to its total weight, of between 65% and 72% and a content of said agent by dry weight, in relation to the total dry weight of mineral material, of between 0.05% and 1.00%, and wherein the percentage by molar weight of the carboxylic groups neutralized by the lithium ion is between 50% and 100%.

* * * * *